US010604034B2

(12) United States Patent
Mason et al.

(10) Patent No.: US 10,604,034 B2
(45) Date of Patent: Mar. 31, 2020

(54) CHILD SAFETY SEAT

(71) Applicant: Wonderland Switzerland AG, Steinhausen (CH)

(72) Inventors: Kyle S. Mason, Lititz, PA (US); David A. Lehman, Lancaster, PA (US)

(73) Assignee: Wonderland Switzerland AG, Steinhausen (CH)

( * ) Notice: Subject to any disclaimer, the term of this patent is extended or adjusted under 35 U.S.C. 154(b) by 0 days.

(21) Appl. No.: 16/113,764

(22) Filed: Aug. 27, 2018

(65) Prior Publication Data
US 2019/0061570 A1 Feb. 28, 2019

Related U.S. Application Data

(60) Provisional application No. 62/550,838, filed on Aug. 28, 2017.

(51) Int. Cl.
B60N 2/28 (2006.01)
A47D 1/10 (2006.01)
A47D 1/00 (2006.01)

(52) U.S. Cl.
CPC ........... *B60N 2/2812* (2013.01); *A47D 1/002* (2013.01); *B60N 2/2851* (2013.01); *B60N 2/2863* (2013.01); *B60N 2/2872* (2013.01); *B60N 2002/2815* (2013.01); *B60N 2002/2818* (2013.01)

(58) Field of Classification Search
CPC .. B60N 2/2812; B60N 2/2851; B60N 2/2863; B60N 2/2872
USPC ................. 297/250.1–256.16, 464, 465, 467
See application file for complete search history.

(56) References Cited

U.S. PATENT DOCUMENTS

| 5,902,015 A * | 5/1999 | Allcock .................. B25B 7/123 |
| | | 297/250.1 |
| 8,272,689 B2 * | 9/2012 | Biaud .................. B60N 2/2812 |
| | | 297/250.1 |
| 8,833,854 B2 * | 9/2014 | Lu .......................... A47D 1/103 |
| | | 297/253 |
| 9,278,666 B2 * | 3/2016 | Leese .................... B60R 22/105 |
| 10,173,553 B2 * | 1/2019 | Mitchell .............. B60N 2/2812 |
| 10,266,077 B2 * | 4/2019 | Mason ................. B60N 2/2812 |

(Continued)

FOREIGN PATENT DOCUMENTS

JP 06286511 A * 10/1994

*Primary Examiner* — Rodney B White
(74) *Attorney, Agent, or Firm* — NZ Carr Law Office PLLC

(57) ABSTRACT

A child safety seat includes a support base, a seat shell disposed on the support base and having a front end provided with an opening, a harness system for restraining a child, and a release actuator. The harness system includes a locking device that is concealed inside the child safety seat and has a clamping member, and an adjustment strap passing through the locking device and extending outside the seat shell through the opening, an inner portion of the adjustment strap extending inside the child safety seat between the locking device and the opening. The locking device has a release state where the clamping member unclamps the adjustment strap, and a locking state where the clamping member clamps the adjustment strap. The release actuator is configured to operatively connect with the locking device, and is operable to switch the locking device from the locking state to the release state.

22 Claims, 7 Drawing Sheets

(56) References Cited

U.S. PATENT DOCUMENTS

| | | | |
|---|---|---|---|
| 2004/0000802 A1* | 1/2004 | Clement | B60N 2/2806 297/250.1 |
| 2012/0169098 A1* | 7/2012 | Spence | B60N 2/2812 297/256.15 |
| 2012/0200131 A1* | 8/2012 | Mason | B60N 2/2806 297/250.1 |
| 2013/0001992 A1* | 1/2013 | Hartenstine | B60N 2/2866 297/250.1 |
| 2013/0106157 A1* | 5/2013 | Cheng | B60N 2/26 297/250.1 |
| 2014/0265489 A1* | 9/2014 | Morgenstern | B60N 2/2812 297/256.15 |
| 2016/0114706 A1* | 4/2016 | Hutchinson | B60N 2/2821 297/256.13 |
| 2016/0176320 A1* | 6/2016 | Williams | B60N 2/2875 297/256.13 |
| 2018/0050614 A1* | 2/2018 | Gay | B60N 2/2845 |
| 2019/0248321 A1* | 8/2019 | Mitter | B60N 2/686 |

* cited by examiner

CHILD SAFETY SEAT

CROSS-REFERENCE TO RELATED APPLICATION(S)

This patent application claims priority to U.S. Provisional Patent Application No. 62/550,838 filed on Aug. 28, 2017, the disclosure of which is incorporated herein by reference.

BACKGROUND

1. Field of the Invention

The present invention relates to child safety seats.

2. Description of the Related Art

A child safety seat is typically used in an automobile vehicle to properly restrain a child in the event of accidental collision. It is widely known that a child safety seat that is placed in a rear facing position can provide better protection, because it can distribute crash forces over a larger portion of the body (i.e., the back supporting the head). Accordingly, safety experts and car seat manufacturers have changed the recommendations to seat children in a vehicle in a rear facing position until the age of 2 years old. However, the child safety seats currently available on the market are usually dimensioned to receive younger children having a small body. These child safety seats when installed in the rear facing position do not leave enough room to receive older children having longer legs.

In order to remedy the aforementioned disadvantage, some existing approach propose a child safety seat having an extendible element that may be deployed at the front of the child safety seat to create a greater space between the seatback of a vehicle seat and the front of the child safety seat in the rear facing position. However, the presence of the extendible element may interfere with other existing functional features, such as the adjustment of a harness provided on the child safety seat.

Therefore, there is a need for an improved child safety seat that can accommodate children of different ages, and can address at least the foregoing issues.

SUMMARY

The present application describes a child safety seat that can be adjustable to accommodate children of different ages in a rear facing configuration and have a harness system convenient to operate for adjustment. In one embodiment, the child safety seat includes a support base, a seat shell disposed on the support base and having a front end provided with an opening, a harness system operable to restrain a child on the seat shell, and a release actuator. The harness system includes a locking device that is concealed inside the child safety seat and has a clamping member, and an adjustment strap passing through the locking device and extending outside the seat shell through the opening, an inner portion of the adjustment strap extending inside the child safety seat between the locking device and the opening, the locking device having a release state where the clamping member unclamps the adjustment strap for movement of the adjustment strap through the locking device, and a locking state where the clamping member clamps the adjustment strap to prevent movement of the adjustment strap through the locking device. The release actuator is configured to operatively connect with the locking device, the release actuator being operable to switch the locking device from the locking state to the release state.

According to another embodiment, the child safety seat includes a seat shell, a harness system for restraining a child on the seat shell, an extension part connected with the seat shell, and a release actuator provided on the extension part. The harness system includes a locking device affixed to the seat shell, and an adjustment strap passing through the locking device and extending outside the seat shell, the locking device having a release state allowing movement of the adjustment strap through the locking device, and a locking state preventing movement of the adjustment strap through the locking device. The extension part is movable relative to the seat shell to extend forward from a front edge of the seat shell or retract toward the seat shell, the extension part being positioned adjacent to a seatback of a vehicle seat when the child safety seat is installed on the vehicle seat in a rear facing position. The release actuator is operatively connected with the locking device, and is operable to switch the locking device from the locking state to the release state, the release actuator being movable along with the extension part relative to the seat shell and the locking device.

According to yet another embodiment, a child safety seat includes a support base having a shell body, a seat shell disposed on the shell body of the support base, a harness system for restraining a child on the seat shell, and a release actuator provided on the shell body. The harness system includes a locking device attached to the shell body of the support base, and an adjustment strap passing through the locking device and extending outside the support base, the locking device having a release state allowing movement of the adjustment strap through the locking device, and a locking state preventing movement of the adjustment strap through the locking device. The release actuator is configured to operatively connect with the locking device, the release actuator being operable to switch the locking device from the locking state to the release state.

DETAILED DESCRIPTION OF THE EMBODIMENTS

Figure 1:
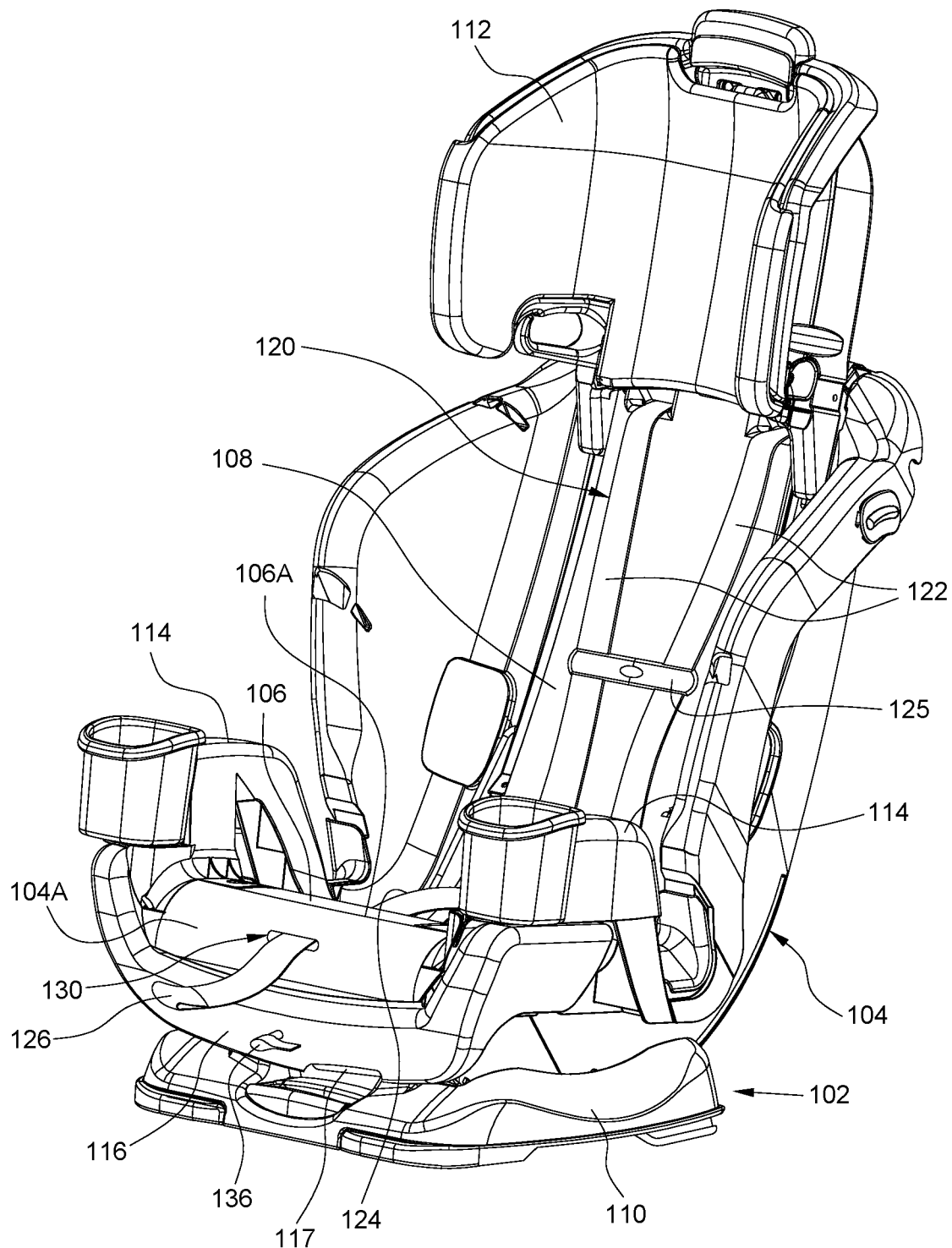
FIG. 1 is a perspective view illustrating an embodiment of a child safety seat.

FIG. 1 is a perspective view illustrating an embodiment of a child safety seat 100 suitable for seating a child in a vehicle. The child safety seat 100 can exemplary include a support base 102, and a seat shell 104 disposed on the support base 102. The support base 102 can provide stable support for the seat shell 104, and allow recline adjustment of the seat shell 104. The seat shell 104 can have a seat portion 106 and a backrest 108. The seat shell 104, including the seat portion 106 and the backrest 108, may be formed by plastic molding. According to an example of construction, the support base 102 can include a shell body 110 made of a rigid plastic material, and the seat shell 104 can be disposed on the shell body 110 of the support base 102.

The seat portion 106 of the seat shell 104 can have a seat surface 106A on which a child can sit, and can extend from the backrest 108 toward a front of the seat shell 104 and terminate at a front edge 104A of the seat shell 104 opposite to the backrest 108. The backrest 108 can be assembled with a headrest 112 that is adjustable to adapt to the height of a child received on the seat shell 104. Moreover, the seat shell 104 can have a left and a right armrest 114 that rise upward from the seat surface 106A at a left and a right side of the seat shell 104.

Referring to FIG. 1, the seat shell 104 can be connected with an extension part 116. More specifically, the extension part 116 can be connected with the seat shell 104 for sliding displacement along a lengthwise axis extending from a rear to a front of the seat shell 104. According to an example of construction, the extension part 116 can be disposed in a cavity of the seat shell 104 below the seat surface 106A of the seat portion 106, and can have a width extending from a left to a right side of the seat portion 106. The extension part 116 is movable relative to the seat shell 104 to extend forward from the front edge 104A of the seat shell 104 or retract toward the seat shell 104. When the child safety seat 100 is installed on a vehicle seat in a rear facing position, the extension part 116 is positioned adjacent to a seatback of the vehicle seat, and may be movably adjusted relative to the seat shell 104 as desired. In particular, the extension part 116 may be extended from the front edge 104A of the seat shell 104 so that a greater space may be left between the seatback of the vehicle seat and the front of the seat shell 104 for placement of the child's legs.

Figure 2:
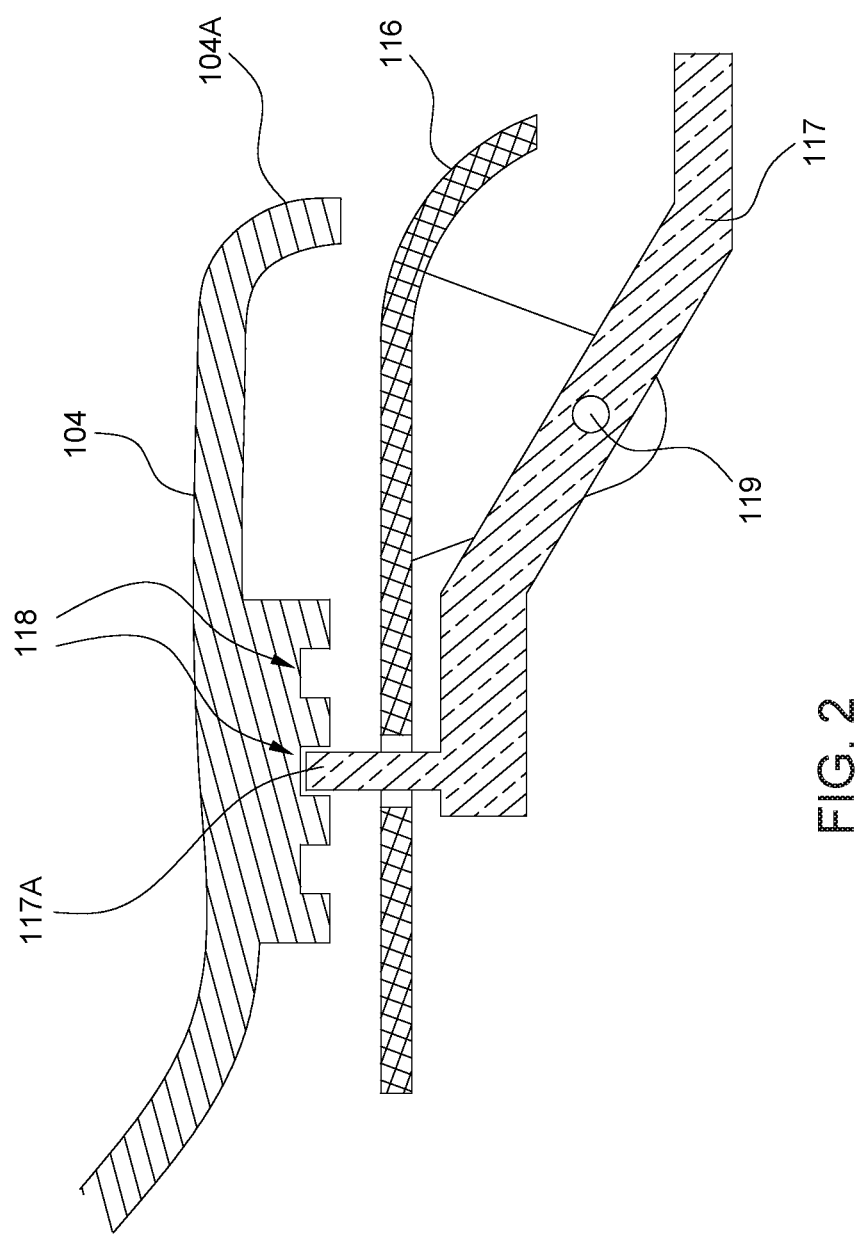
FIG. 2 is a partial cross-sectional view illustrating exemplary construction of a latching mechanism of an extension part provided in the child safety seat shown in FIG. 1.

In conjunction with FIG. 1, FIG. 2 is a partial cross-sectional view illustrating exemplary construction of a latching mechanism of the extension part 116. Referring to FIGS. 1 and 2, the latching mechanism of the extension part 116 may include a release handle 117, and a plurality of locking grooves 118 provided on the seat shell 104. The release handle 117 can be pivotally connected with the extension part 116 via a pivot link 119, an can be exposed at the front end of the extension part 116 for operation. Moreover, an inner end of the release handle 117 can have a protrusion 117A that can engage with any of the locking grooves 118 to lock the extension part 116 in position relative to the seat shell 104. The release handle 117 can be operated to disengage the protrusion 117A from the locking grooves 118 for adjustment of the extension part 116.

Referring again to FIG. 1, a harness system 120 can be coupled to the seat shell 104 for restraining a child on the seat shell 104. The harness system 120 can include a plurality of restraining straps 122 and 124 extending on the seat portion 106 and the backrest 108 of the seat shell 104. The two restraining straps 122 are exemplary shoulder straps, and the restraining strap 124 is exemplary a crotch strap. A chest clip 125 may be provided to keep the restraining straps 122 at a proper distance from each other. The restraining straps 122 may be loosened to facilitate placement or removal of a child on the seat shell 104. Once a child is placed on the seat shell 104, the restraining straps 122 can be installed over the child, fastened to the restraining strap 124, and then tightened to securely restrain a child on the seat shell 104.

Figure 3:
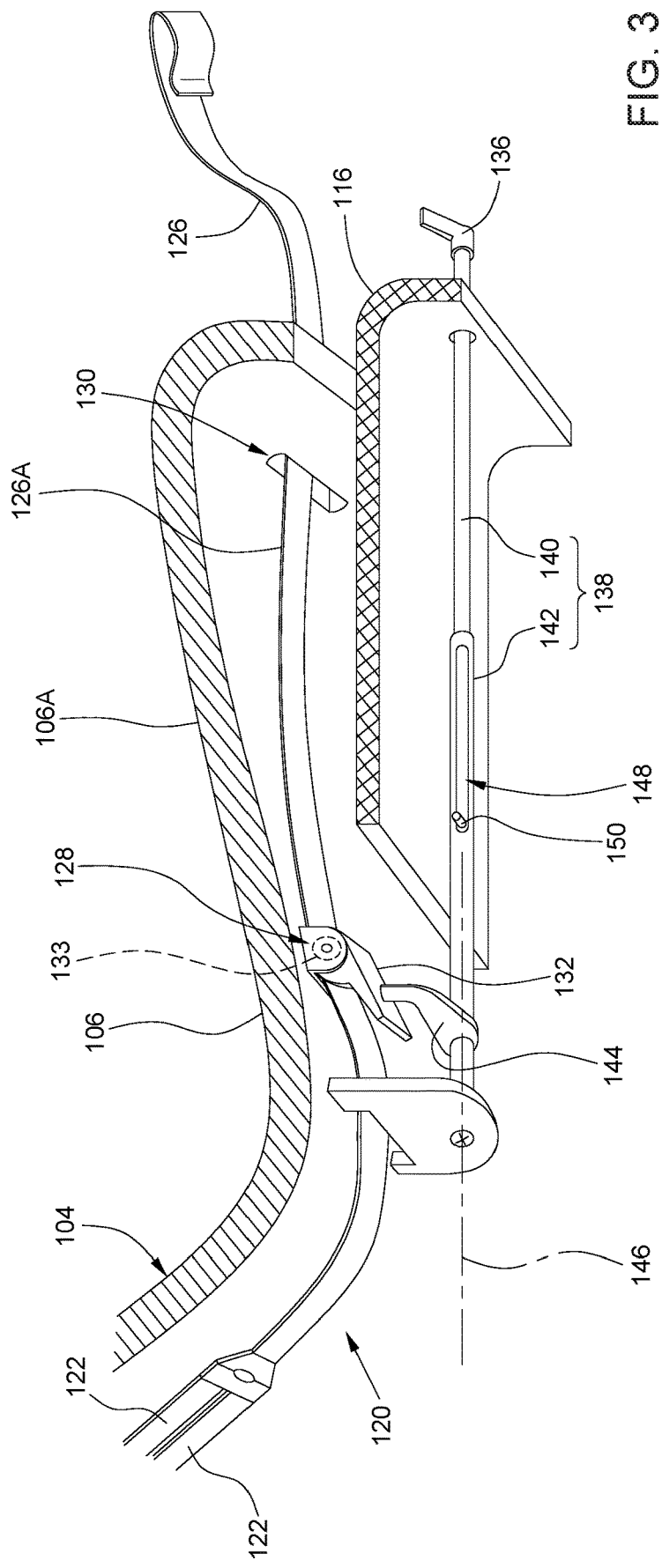
FIG. 3 is a partial cross-sectional view illustrating construction details of a harness system provided in the child safety seat shown in FIG. 1.

In conjunction with FIG. 1, FIG. 3 is a partial cross-sectional view illustrating further construction details of the harness system 120. Referring to FIGS. 1 and 3, the harness system 120 can further include an adjustment strap 126 and a locking device 128. The adjustment strap 126 can be coupled to the restraining straps 122, routed below the seat surface 106A of the seat portion 106 and through the locking device 128, and extend outside the seat shell 104 via an opening 130 provided at a front end of the seat shell 104. The opening 130 may be exemplary placed above the extension part 116. A caregiver can conveniently operate the adjustment strap 126 to adjust the restraining straps 122. In particular, pulling the adjustment strap 126 in a direction that increases the length thereof extending outward from the opening 130 can reduce the length of the restraining straps 122 in front of the backrest 108. Reversely, loosening of the restraining straps 122 can cause the adjustment strap 126 to slide through the opening 130 toward an interior of the seat shell 104.

The locking device 128 is concealed inside the child safety seat 100, so that an inner portion 126A of the adjustment strap 126 extends inside the child safety seat 100 between the locking device 128 and the opening 130. The locking device 128 can be affixed to the seat shell 104, e.g., below the seat surface 106A of the seat portion 106. The locking device 128 has a release state allowing movement of the adjustment strap 126 through the locking device 128, and a locking state preventing movement of the adjustment strap 126 through the locking device 128. According to an example of construction, the locking device 128 can include a clamping member 132 and a spring 133 (shown with phantom lines in FIG. 3). The clamping member 132 is movable to clamp the adjustment strap 126 in the locking state and unclamp the adjustment strap 126 in the release state. The clamping member 132 may be exemplary connected pivotally with the seat shell 104, and is rotatable relative to the seat shell 104 to clamp and unclamp the adjustment strap 126. The spring 133 may be exemplary a torsion spring, and is connected with the clamping member 132. The spring 133 can bias the clamping member 132 for clamping the adjustment strap 126.

According to an embodiment, the locking device 128 may be configured so that the locking state thereof can prevent sliding of the adjustment strap 126 in the direction for loosening the restraining straps 122, and can be urged by the adjustment strap 126 to switch to the release state as the adjustment strap 126 is pulled in an opposite direction for facilitating passage of the adjustment strap 126 through the locking device 128. For example, the clamping member 132 can have a plurality of teeth engageable with the adjustment strap 126 to apply unidirectional locking, i.e., preventing the adjustment strap 126 from sliding in the direction for loosening the restraining straps 122, but allowing the adjustment strap 126 to slide in the opposite direction for reducing the length of the restraining straps 122 in front of the backrest 108. In particular, the contact between the teeth of the clamping member 132 and the adjustment strap 126 may be such that pulling the adjustment strap 126 outward from the opening 130 of the seat shell 104 can urge the clamping member 132 to rotate and release the adjustment strap 126 for facilitating its passage through the locking device 128.

Referring to FIGS. 1 and 3, a release actuator 136 is provided on the extension part 116, and is configured to operatively connect with the locking device 128. The release actuator 136 is operable to urge the clamping member 132 to unclamp the adjustment strap 126 and thereby switch the locking device 128 from the locking state to the release state.

According to an example of construction, the release actuator 136 can be pivotally connected with the extension part 116 about a pivot axis extending from a rear to a front of the seat shell 104. According to an example of construction, the release actuator 136 may be disposed at a front end of the extension part 116. The release actuator 136 can include a lever, a knob or any suitable structure that can be grasped with one hand for operation. Since the release actuator 136 is provided on the extension part 116, the release actuator 136 is movable along with the extension part 116 relative to the seat shell 104 and the locking device 128 during adjustment of the extension part 116.

The release actuator 136 can be operatively connected with the locking device 128 via a coupling assembly 138 that can retract and expand during adjustment of the extension part 116. According to an example of construction, the coupling assembly 138 can include two rods 140 and 142. The rod 140 can be pivotally connected with the extension part 116 and can have an end connected with the release actuator 136, e.g., the release actuator 136 may be fixedly attached to the rod 140. The rod 142 can be pivotally connected with the seat shell 104 and can be fixedly connected with an actuating part 144 disposed adjacent to the clamping member 132. Moreover, the two rods 140 and 142 may be slidably connected with each other so that they can slide relative to each other along an axis 146 extending from a rear to a front of the seat shell 106. For example, the two rods 140 and 142 may be exemplary two tubes telescopically connected with each other. In addition, one of the two rods 140 and 142 may have an elongate guide slot 148 extending along the axis 146 (e.g., the guide slot 148 may be provided on the rod 142), and the other one of the two rods 140 and 142 may have a protrusion 150 received through the guide slot 148 (e.g., the protrusion 150 may be fixedly connected with the rod 140), whereby the two rods 140 and 142 are rotationally linked to each other about the axis 146. Accordingly, the release actuator 136 and the rod 140 can slide in unison with the extension part 116 along the axis 146 relative to the rod 142, the actuating part 144, the seat shell 104 and the locking device 128 during adjustment of the extension part 116 relative to the seat shell 104. The locking device 128 can remain in the locking state during adjustment of the extension part 116. Moreover, the release actuator 136 is operable to cause the two rods 140 and 142 and the actuating part 144 to rotate in unison about the axis 146 so that the actuating part 144 contacts and urges the clamping member 136 to rotate and unclamp the adjustment strap 126.

With the aforementioned construction, a caregiver can operate the release actuator 136 for switching the locking device 128 to the release state, and then pull and loosen the restraining straps 122 in front of the backrest 108. Loosening of the restraining straps 122 while the locking device 128 is in the release state can cause the adjustment strap 126 to slide toward an interior of the seat shell 104. Moreover, pulling the adjustment strap 126 outward at the front of the seat shell 104 can urge the clamping member 136 in rotation for releasing the adjustment strap 126, which allows the adjustment strap 126 to slide through the locking device 128 and reduce the length of the restraining straps 122 in front of the backrest 108.

Figure 4:
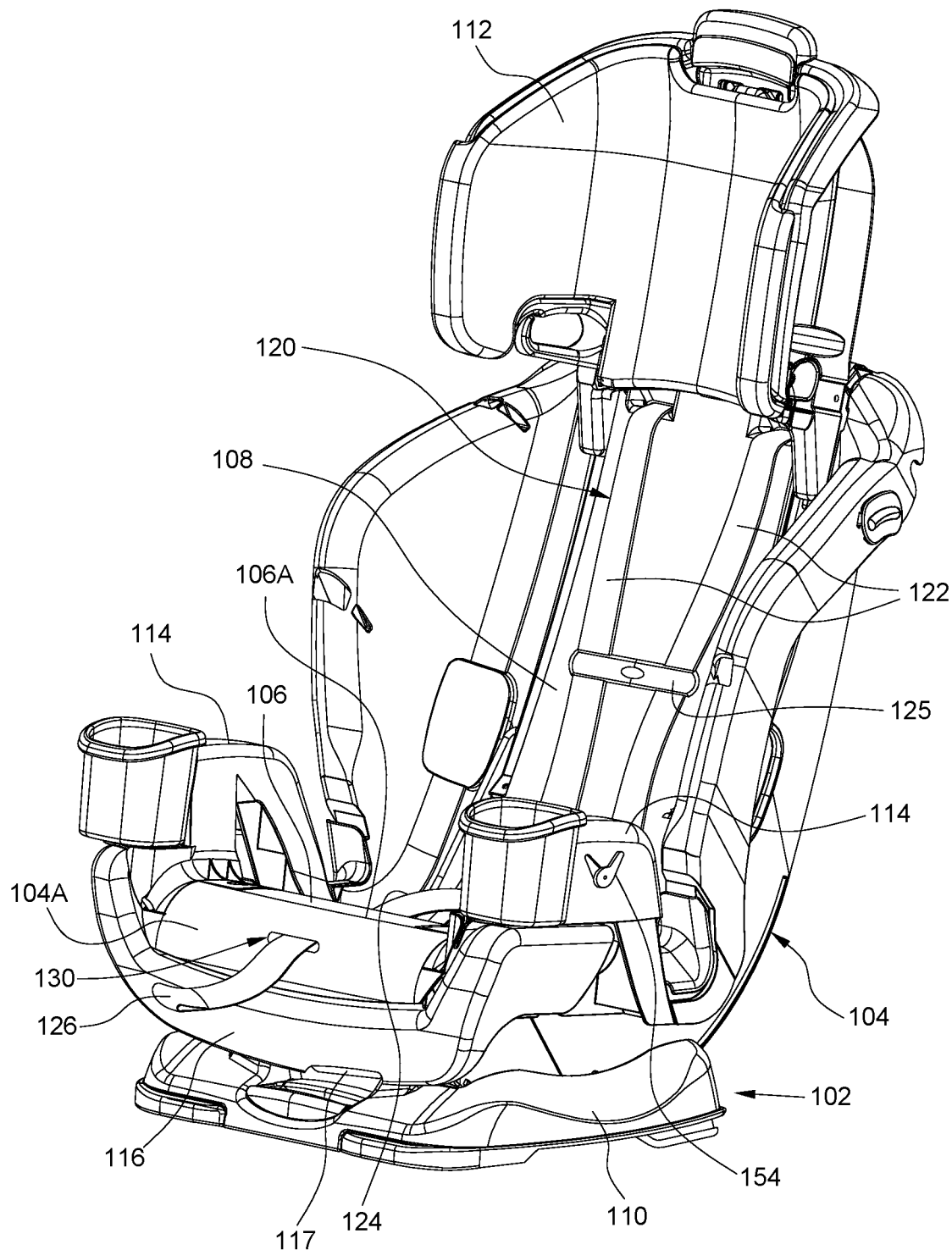
FIG. 4 is a perspective view illustrating another embodiment of a child safety seat.

FIG. 4 is a perspective view illustrating another embodiment of the child safety seat 100'. Like previously described, the child safety seat 100' illustrated in FIG. 4 can include the seat shell 104 disposed on the shell body 110 of the support base 102, the extension part 116 movable to extend forward the front of the seat shell 104, and the harness system 120 for restraining a child on the seat shell 106. The harness system 120 can have a construction similar to that described previously, including the restraining straps 122 and 124, the adjustment strap 126 and the locking device 128 (better shown in FIG. 5). Moreover, the child safety seat 100' can include a release actuator 154 operable to switch the locking device 128 from the locking state to the release state, which substitutes for the release actuator 136 described previously. In the embodiment of FIG. 4, the release actuator 154 is provided on the seat shell 104.

Figure 5:
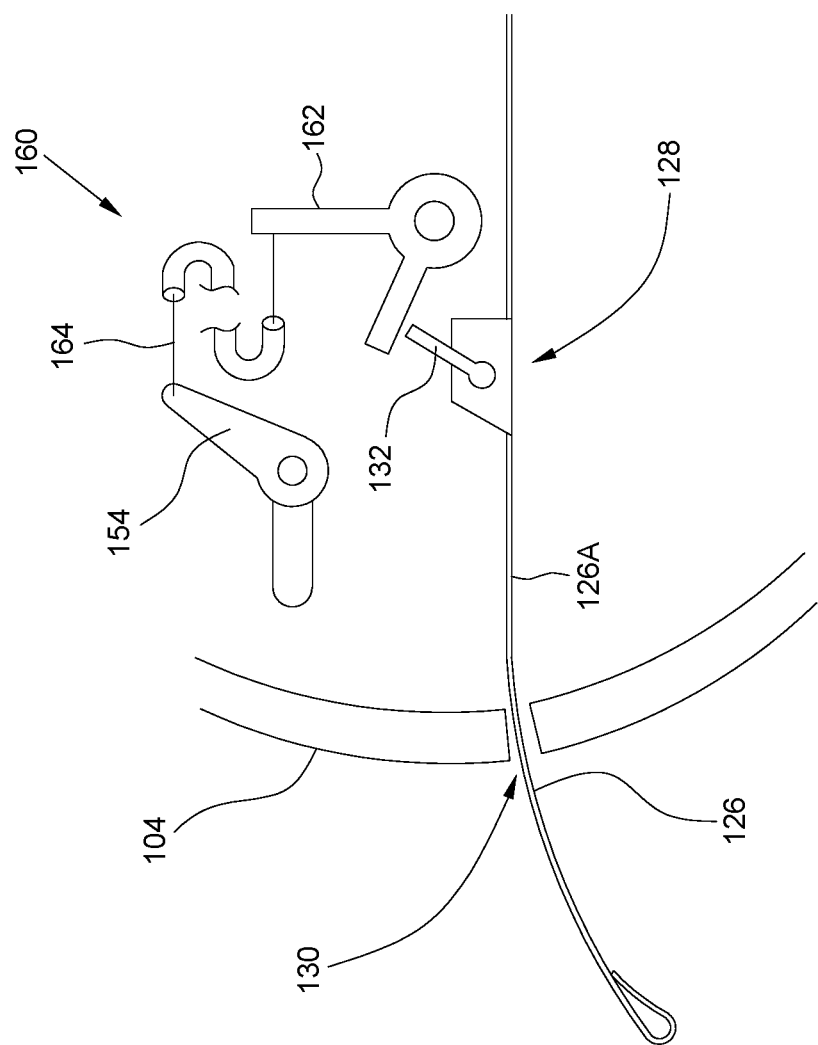
FIG. 5 is a schematic view illustrating construction details of a release actuator and a harness system provided in the child safety seat shown in FIG. 4.

In conjunction with FIG. 4, FIG. 5 is a schematic view illustrating further construction details of the release actuator 154 and the harness system 120 provided in the child safety seat 100'. Referring to FIGS. 4 and 5, the locking device 128 of the harness system 120 can be concealed inside the child safety seat 100' and include the clamping member 132 operable to clamp and unclamp the adjustment strap 126, like described in the previous embodiment. An inner portion 126A of the adjustment strap 126 can extend inside the child safety seat 100' between the locking device 128 and the opening 130 on the front end of the seat shell 104.

Referring to FIGS. 4 and 5, the release actuator 154 can be disposed on a side (e.g., left or right side) of the seat shell 104, and can be pivotally connected with the seat shell 104 about a pivot axis that extends transversally from a left to a right side of the seat shell 104. The release actuator 154 can include a lever, a knob or any suitable structure that can be grasped with one hand for operation. The release actuator 154 is configured to operatively connect with the locking device 128 via a coupling assembly 160 that includes an actuating part 162 and a sheathed cable 164. The actuating part 162 can be disposed adjacent to the clamping member 132, and can be pivotally connected with the seat shell 104. The cable 164 can have two ends respectively attached to the release actuator 154 and the actuating part 162. Accordingly, the release actuator 154 is operable to pull the cable 164 and thereby urge the actuating part 162 to rotate, which in turn can contact and urge the clamping member 132 to unclamp the adjustment strap 126, thereby switching the locking device 128 from the locking state to the release state. It will be appreciated that some variant embodiments may omit the actuating part 162 and directly connect an end of the cable 164 with the clamping member 132, whereby the release actuator 154 is operable to pull the cable 164 and urge the clamping member 132 to rotate for unclamping the adjustment strap 126.

With the aforementioned construction, a caregiver can operate the release actuator 154 for switching the locking device 128 to the release state, and then pull and loosen the restraining straps 122 in front of the backrest 108. Loosening of the restraining straps 122 while the locking device 128 is in the release state can cause the adjustment strap 126 to slide toward an interior of the seat shell 104.

Figure 6:
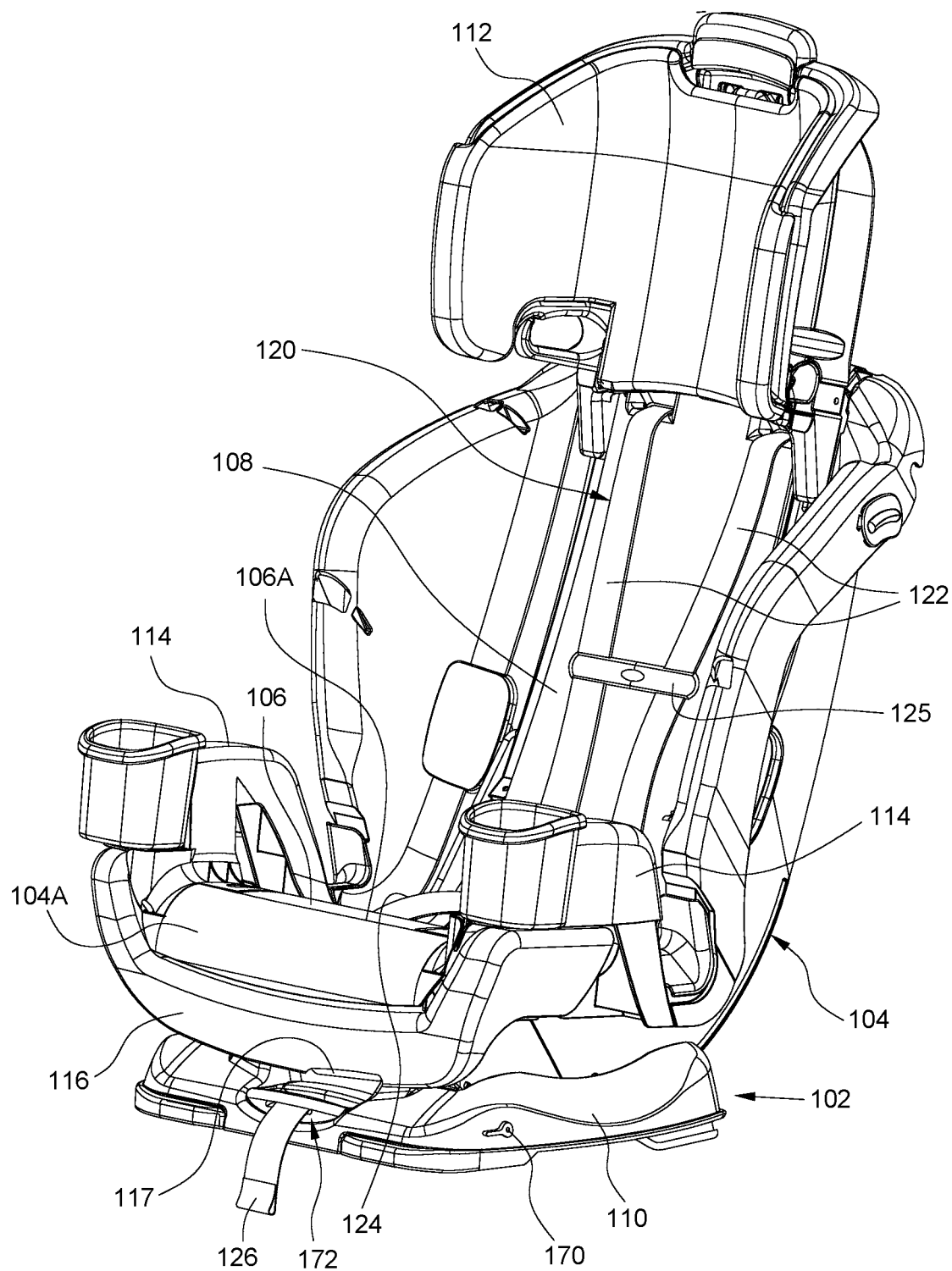
FIG. 6 is a perspective view illustrating another embodiment of a child safety seat.

FIG. 6 is a perspective view illustrating another embodiment of the child safety seat 100". Like previously described, the child safety seat 100" illustrated in FIG. 6 can include the seat shell 104 disposed on the shell body 110 of the support base 102, the extension part 116 movable to extend forward the front of the seat shell 104, and the harness system 120 for restraining a child on the seat shell 106. The harness system 120 can have a construction similar to that described previously, including the restraining straps 122 and 124, the adjustment strap 126 coupled to the restraining straps 122, and the locking device 128 (better shown in FIG. 7) operable to clamp and unclamp the adjustment strap 126. Moreover, the child safety seat 100" can include one or more release actuator 170 operable to switch the locking device 128 from the locking state to the release state, which can substitute for the release actuator 136 or 154 described previously. In the embodiment of FIG. 6, the release actuator 170 is provided on the support base 102.

Figure 7:
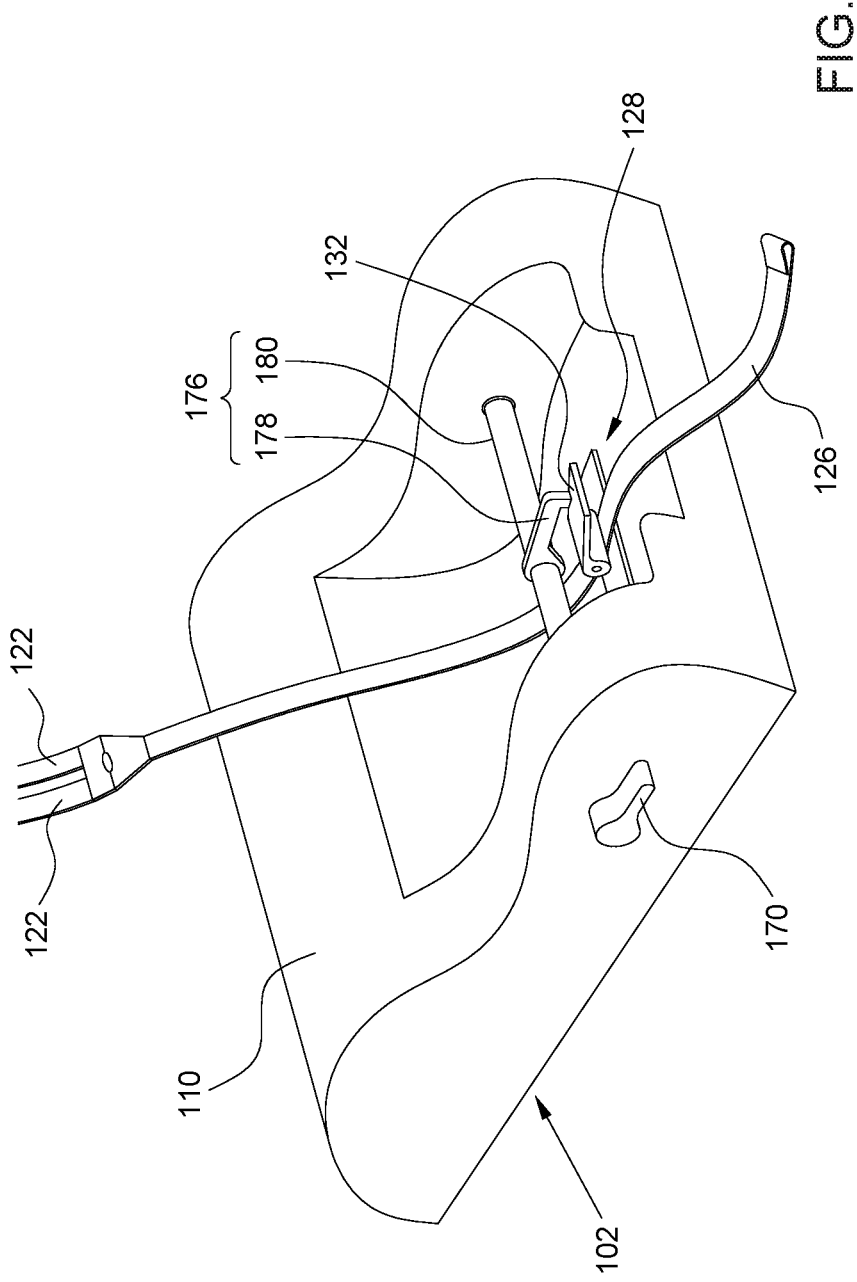
FIG. 7 is a schematic view illustrating further construction details of a harness system provided in the child safety seat shown in FIG. 6.

In conjunction with FIG. 6, FIG. 7 is a schematic view illustrating further construction details of the harness system 120 provided in the child safety seat 100″. For clarity, the seat shell 104 is omitted in FIG. 7. Referring to FIGS. 6 and 7, the locking device 128 can be concealed inside the child safety seat 100″ and include the clamping member 132. More specifically, the locking device 128 can be attached to the shell body 110 of the support base 102 at a location below the seat shell 104, the clamping member 132 of the locking device 128 being pivotally connected with the shell body 110. The adjustment strap 126 can be coupled to the restraining straps 122, pass through the locking device 128 inside the shell body 110 of the support base 102, and extend outside the support base 102 via an opening 172 provided at a front end of the shell body 110. Accordingly, an inner portion 126A of the adjustment strap 126 can extend inside the child safety seat 100 between the locking device 128 and the opening 172 on the front end of the shell body 110. Like previously described, the clamping member 132 can clamp the adjustment strap 126 in the locking state for preventing movement of the adjustment strap 126 through the locking device 128, and unclamp the adjustment strap 126 in the release state for passage of the adjustment strap 126 through the locking device 128.

The release actuator 170 can be disposed on a side (e.g., left or right side) of the support base 102, and can be pivotally connected with the shell body 110 about a pivot axis that extends transversally from a left to a right side of the seat shell 104. The release actuator 170 can include a lever, a knob or any suitable structure that can be grasped with one hand for operation. In one embodiment, two release actuators 170 can be respectively provided on the left and right sides of the support base 102 for convenient operation. Each release actuator 170 is configured to operatively connect with the locking device 128 via a coupling assembly 176 that includes an actuating part 178 and a shaft portion 180. According to an example of construction, the shaft portion 180 can extend inside the shell body 110 of the support base 102, and can be pivotally connected with the shell body 110 of the support base 102, e.g., about the same pivot axis as the release actuators 170. Each release actuator 170 can be fixedly connected with the shaft portion 180 at an end thereof, and the actuating part 178 can be fixedly connected with the shaft portion 180 at a position adjacent to the clamping member 132. Accordingly, each release actuator 170 is operable to urge the shaft portion 180 and the actuating part 178 to rotate, whereby the actuating part 178 can contact and urge the clamping member 132 to unclamp the adjustment strap 126 for switching the locking device 128 from the locking state to the release state.

It would be appreciated that the release actuator 170 and the locking device 128 provided on the support base 102 may be operatively connected with each other via a coupling assembly that has other variant constructions. For example, rather than using the shaft portion 180 previously described, the release actuator 170 may be connected with the actuating part 178 via a cable (similar to the cable 164 shown in FIG. 5), and the actuating part 178 may be pivotally connected with the shell body 110 adjacent to the clamping member 132. Such construction would be similar to and operate in the same manner as the embodiment described previously with reference to FIG. 5, i.e., the release actuator 170 is operable to pull the cable and urge the actuating part 178 to rotate so that the actuating part 178 contacts and urges the clamping member 132 to unclamp the adjustment strap 126.

Advantages of the structures described herein include the ability to adjust a front leg room of a child safety seat installed in a rear facing configuration, so that the child safety seat can accommodate children of different ages. Moreover, the child safety seat can include a harness system is convenient to operate for adjustment.

Realizations of the child safety seats have been described in the context of particular embodiments. These embodiments are meant to be illustrative and not limiting. Many variations, modifications, additions, and improvements are possible. These and other variations, modifications, additions, and improvements may fall within the scope of the inventions as defined in the claims that follow.

What is claimed is:

1. A child safety seat comprising:
   a support base;
   a seat shell disposed on the support base and having a front end provided with an opening;
   a harness system operable to restrain a child on the seat shell, the harness system including a locking device that is concealed inside the child safety seat and has a clamping member, and an adjustment strap passing through the locking device and extending outside the seat shell through the opening, an inner portion of the adjustment strap extending inside the child safety seat between the locking device and the opening, the locking device having a release state where the clamping member unclamps the adjustment strap for movement of the adjustment strap through the locking device, and a locking state where the clamping member clamps the adjustment strap to prevent movement of the adjustment strap through the locking device; and
   a release actuator spaced apart from the locking device and configured to operatively connect with the locking device, the release actuator being operable to switch the locking device from the locking state to the release state.

2. The child safety seat according to claim 1, further including an extension part connected with the seat shell, the extension part being movable relative to the seat shell to extend forward from a front edge of the seat shell or retract toward the seat shell, the extension part being positioned adjacent to a seatback of a vehicle seat when the child safety seat is installed on the vehicle seat in a rear facing position.

3. The child safety seat according to claim 2, wherein the release actuator is provided on the extension part, the release actuator being movable along with the extension part relative to the seat shell and the locking device.

4. The child safety seat according to claim 3, wherein the release actuator is operable to urge the clamping member to unclamp the adjustment strap.

5. The child safety seat according to claim 4, wherein the release actuator is operatively connected with the locking device via a coupling assembly including a first and a second rod, the first rod being movable with the extension part relative to the second rod and having an end connected with the release actuator, and the second rod being connected with an actuating part that is movable to contact and urge the clamping member to unclamp the adjustment strap.

6. The child safety seat according to claim 5, wherein the release actuator and the first rod are slidable along an axis relative to the second rod and the locking device during adjustment of the extension part relative to the seat shell, the release actuator is operable to cause the first and second rods and the actuating part to rotate in unison about the axis so that the actuating part contacts and urges the clamping member to unclamp the adjustment strap.

7. The child safety seat according to claim 1, wherein the release actuator is configured to operatively connect with the locking device via a coupling assembly including a cable, the release actuator being operable to pull the cable and thereby cause the clamping member to unclamp the adjustment strap.

8. The child safety seat according to claim 1, wherein the release actuator is provided on a side of the seat shell.

9. The child safety seat according to claim 1, wherein the harness system includes a restraining strap coupled to the adjustment strap, the restraining strap being installable over a child received on the seat shell, loosening of the restraining strap while the locking device is in the release state causing the adjustment strap to slide toward an interior of the seat shell.

10. A child safety seat comprising:
a seat shell;
a harness system for restraining a child on the seat shell, the harness system including a locking device affixed to the seat shell, and an adjustment strap passing through the locking device and extending outside the seat shell, the locking device having a release state allowing movement of the adjustment strap through the locking device, and a locking state preventing movement of the adjustment strap through the locking device;
an extension part connected with the seat shell, the extension part being movable relative to the seat shell to extend forward from a front edge of the seat shell or retract toward the seat shell, the extension part being positioned adjacent to a seatback of a vehicle seat when the child safety seat is installed on the vehicle seat in a rear facing position; and
a release actuator provided on the extension part and operatively connected with the locking device, the release actuator being operable to switch the locking device from the locking state to the release state, and the release actuator being movable along with the extension part relative to the seat shell and the locking device.

11. The child safety seat according to claim 10, wherein the release actuator is disposed at a front end of the extension part.

12. The child safety seat according to claim 10, wherein the release actuator is pivotally connected with the extension part.

13. The child safety seat according to claim 10, wherein the locking device includes a clamping member movable to clamp the adjustment strap in the locking state and unclamp the adjustment strap in the release state, the release actuator being operable to cause the clamping member to unclamp the adjustment strap.

14. The child safety seat according to claim 13, wherein the release actuator is operatively connected with the locking device via a coupling assembly including a first and a second rod, the first rod being movable with the extension part relative to the second rod and having an end connected with the release actuator, and the second rod being connected with an actuating part that is movable to contact and urge the clamping member to unclamp the adjustment strap.

15. The child safety seat according to claim 14, wherein the release actuator and the first rod are slidable along an axis relative to the second rod and the locking device during adjustment of the extension part relative to the seat shell, the release actuator is operable to cause the first and second rods and the actuating part to rotate in unison about the axis so that the actuating part contacts and urges the clamping member to unclamp the adjustment strap.

16. The child safety seat according to claim 10, wherein the harness system includes a restraining strap coupled to the adjustment strap, the restraining strap being installable over a child received on the seat shell, loosening of the restraining strap while the locking device is in the release state causing the adjustment strap to slide toward an interior of the seat shell.

17. A child safety seat comprising:
a support base having a shell body;
a seat shell disposed on the shell body of the support base;
a harness system operable to restrain a child on the seat shell, the harness system including a locking device attached to the shell body of the support base, and an adjustment strap passing through the locking device and extending outside the support base, the locking device having a release state allowing movement of the adjustment strap through the locking device, and a locking state preventing movement of the adjustment strap through the locking device; and
a release actuator provided on the shell body at a location spaced apart from the locking device and configured to operatively connect with the locking device, the release actuator being operable to switch the locking device from the locking state to the release state.

18. The child safety seat according to claim 17, wherein the release actuator is disposed on a side of the support base.

19. The child safety seat according to claim 17, wherein the locking device includes a clamping member pivotally connected with the shell body of the support base, the clamping member clamping the adjustment strap in the locking state and unclamping the adjustment strap in the release state, the release actuator being operable to urge the clamping member to unclamp the adjustment strap.

20. The child safety seat according to claim 19, wherein the release actuator is fixedly connected with a shaft portion extending inside the shell body, the shaft portion being provided with an actuating part movable to contact and urge the clamping member to unclamp the adjustment strap.

21. The child safety seat according to claim 19, wherein the shell body is pivotally connected with an actuating part disposed adjacent to the clamping member, and the release actuator is connected with the actuating part via a cable, the release actuator being operable to urge the actuating part to rotate so that the actuating part contacts and urges the clamping member to unclamp the adjustment strap.

22. The child safety seat according to claim 17, further including an extension part connected with the seat shell, the extension part being movable relative to the seat shell to extend forward from a front edge of the seat shell or retract toward the seat shell, the extension part being positioned adjacent to a seatback of a vehicle seat when the child safety seat is installed on the vehicle seat in a rear facing position.

* * * * *